(12) United States Patent
Takatsuka et al.

(10) Patent No.: US 8,454,777 B2
(45) Date of Patent: Jun. 4, 2013

(54) METHOD AND APPARATUS OF ADHERING AND BUILDING BELT MEMBER

(75) Inventors: Tomoyuki Takatsuka, Osaka (JP); Taizo Yamamoto, Osaka (JP); Makoto Koumo, Osaka (JP); Yu Hatayama, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 513 days.

(21) Appl. No.: 12/162,524

(22) PCT Filed: Jan. 30, 2006

(86) PCT No.: PCT/JP2006/301458
§ 371 (c)(1),
(2), (4) Date: Dec. 8, 2008

(87) PCT Pub. No.: WO2007/086142
PCT Pub. Date: Aug. 2, 2007

(65) Prior Publication Data
US 2009/0188606 A1   Jul. 30, 2009

(51) Int. Cl.
*B29D 30/30* (2006.01)
*B29D 30/22* (2006.01)

(52) U.S. Cl.
USPC ...... 156/133; 156/124; 156/405.1; 156/406.4

(58) Field of Classification Search
USPC .............. 156/111, 117, 124, 397, 405.1, 133, 156/264, 406.4, 446, 512, 576
See application file for complete search history.

(56) References Cited

U.S. PATENT DOCUMENTS

| 4,457,802 A | * | 7/1984 | Yanagihara et al. | 156/405.1 |
| 4,608,890 A | * | 9/1986 | Still et al. | 83/49 |

(Continued)

FOREIGN PATENT DOCUMENTS

| JP | 58-38143 A | 3/1983 |
| JP | 64-58536 A | 3/1989 |

(Continued)

OTHER PUBLICATIONS

International Search Report of PCT/JP2006/301458, date of mailing Apr. 18, 2006.

*Primary Examiner* — Christina Johnson
*Assistant Examiner* — Martin Rogers
(74) *Attorney, Agent, or Firm* — Westerman, Hattori, Daniels & Adrian, LLP (57) ABSTRACT

The present invention can transfer a belt member on a supply conveyor onto a building drum from an inclined distal end portion while holding on both side edge portions in the width direction thereof and can efficiently adhere the belt member according to the rotation of the building drum. As a means for such building, using a supply conveyor (5) which places the belt member (B1) thereon and a hand device (10) which includes holding members (17a), (17b) having press plates (16a), (16b) extending in the feeding direction of the supply conveyor. In a state that a distal end portion of the belt member (B1) on the supply conveyor is held on a lower surface of the press plates (16a), (16b) of the hand device (10), the belt member (B1) is transferred to the building drum (D) along with a feeding operation of the supply conveyor (5) and, at the same time, the belt member (B1) is adhered by pressing to a peripheral surface of the building drum (D) from a distal end portion thereof while rotating the building drum along with the transfer of the belt member.

3 Claims, 9 Drawing Sheets

U.S. PATENT DOCUMENTS

| | | | |
|---|---|---|---|
| 4,738,743 A | | 4/1988 | Satoh et al. |
| 4,747,904 A | * | 5/1988 | Okuyama et al. ............. 156/403 |
| 4,874,443 A | * | 10/1989 | Kipling ........................... 156/64 |
| 5,385,626 A | * | 1/1995 | Shimizu et al. ............ 156/406.4 |
| 6,669,798 B1 | * | 12/2003 | Okada et al. .................. 156/117 |
| 6,790,301 B2 | * | 9/2004 | Risser et al. ................. 156/73.3 |
| 2005/0258591 A1 | * | 11/2005 | Blumle ......................... 271/243 |

FOREIGN PATENT DOCUMENTS

| | | |
|---|---|---|
| JP | 1-180330 A | 7/1989 |
| JP | 3-286846 A | 12/1991 |
| JP | 11-99564 A | 4/1999 |
| JP | 2000-280373 A | 10/2000 |

\* cited by examiner

METHOD AND APPARATUS OF ADHERING AND BUILDING BELT MEMBER

TECHNICAL FIELD

The present invention relates to a method and apparatus of adhering and building a belt member by adhering and building a belt member used as a belt layer of an air-filled tire while transferring the belt member to a building drum.

BACKGROUND ART

A belt member used as a belt layer of an air-filled tire is configured such that a large number of steel cords which constitutes reinforcing cords is embedded in a rubber material parallel to each other, and the cords are arranged in the oblique direction with a predetermined angle with respect to the circumferential direction of the tire.

Conventionally, the above-mentioned belt member is manufactured such that a strip-shaped material having a relatively wide width and extending in the longitudinal direction of the cords is obliquely cut with a length corresponding to a belt width, and the respective cut fine-strip-shaped pieces are arranged such that cut ends form both side edges, and sides of the fine-strip-shaped pieces are bonded to each other thus forming an elongated belt member having a predetermined belt width. Usually, the elongated belt member formed in the above-mentioned manner is wound in a roll shape and is stocked in a state that the belt member is supported on a transport car, the belt member is transferred to a building step of a belt layer in tire building, and is supplied by pulling.

With respect to a supply method of the belt member in using the belt member, there exists a method which directly pulls out and supplies the wound belt member to a building drum using a servicer, and a supply method by fixed side cutting which cuts the wound belt member to a fixed length corresponding to one turn of the belt layer, and transfers and adheres the cut belt member to a building drum.

However, in the method which pulls out the wound belt member by the servicer and supplies the belt member to the building drum, the servicer per se is not provided with a mechanism for feeding the belt member and hence, the belt member is pulled onto the building drum by holding and pulling a distal end portion of the belt member whereby there exists a possibility that the distal end portion is deformed by a tension which acts on the belt member during such a pulling operation. Further, even during adhesion, the belt member is pulled out by making use of a rotational torque of the building drum and hence, the tension applied to the belt member is increasing thus giving rise to the elongation or the deformation of the belt member. Further, the belt exhibits small deformation at a rear end portion thereof which is adhered and hence, it is difficult to align a bonding surface of the rear end portion with the distal end portion deformed in the above-mentioned manner thus giving rise to drawbacks such as the occurrence of failure of bonding or the occurrence of swelling due to excessive overlapping.

On the other hand, in the supply method of fixed size cutting which supplies the belt member to the building drum after preliminarily cutting the belt member to a fixed length, a tension for pulling out the belt member can be reduced thus improving the supply of the belt member to some extent. However, this supply method is equal to the previously-mentioned supply method with respect to a point that the belt member is pulled out by holding and pulling out the distal end portion of the belt member, and the belt member is adhered while being pulled out by making use of the rotational torque of the building drum. Accordingly, this supply method is less than optimal in overcoming the deformation of the belt member and the failure of bonding of the distal end and the rear end portion of the belt member.

Further, in the method which stocks the elongated belt member by winding the belt member in a roll shape, it is necessary to manufacture and stock many kinds of belt members corresponding to kinds and sizes of tires to be manufactured. This requires a large space for stocking the belt members and, at the same time, makes operations such as selection, transfer, exchange and the like of the belt member corresponding to a tire which is subjected to building cumbersome thus becoming one of causes which interrupt the enhancement of manufacturing efficiency.

In view of the above circumstances, recently, as disclosed in following document 1 and document 2, there has been proposed a method in which a strip-shaped material having a relatively small width and embeds reinforcing cords in a rubber material is obliquely fed with respect to a transfer conveyer, the strip-shaped material is obliquely cut with respect to the longitudinal direction along with such feeding of the strip-shaped material, the cut belt member pieces have sides thereof bonded to each other on the transfer conveyer thus manufacturing the belt member having a length corresponding to one turn of a tire, and the belt member is directly transferred, adhered to a building drum thus performing building. Particularly, patent document 2 also discloses a method in which the belt member formed in the above-mentioned manner is wound by a winding means by way of a liner cloth for separation or is stacked on a stacker device in a developed state, and the belt member is transferred to a belt building step, and is supplied to a building drum.

However, in adhering and building the manufactured belt member to the building drum, in the same manner as the above-mentioned supply method of fixed sides cutting, this proposal also requires an operation in which an operator adheres the belt member to the building drum at the predetermined position by holding and pulling out a distal end portion of the belt member. Accordingly, as described above, the proposal is insufficient with respect to an effect for preventing the deformation of the belt member or an effect of preventing failure of bonding between the distal end and the rear end portion of the belt member. Further, since the distal end of the belt member is arranged obliquely corresponding to the cords and hence, positioning of the belt member for adhesion is not easy thus taking time and worsening operability whereby the automation of the belt adhesion and building is hampered.

Patent Document 1: JP-A-11-99564
Patent Document 2: JP-A-2000-280373

DISCLOSURE OF THE INVENTION

Problems to be Solved by Invention

The present invention is directed to a method and an apparatus of adhering and building a belt member which is provided for overcoming the above-mentioned drawbacks, wherein a belt member on a supply conveyer which faces a building drum at a building position is transferred to the building drum while holding the belt member with almost no tension or completely no tension, and the belt member is efficiently adhered to and built on the building drum along with the rotation of the building drum.

The present invention is directed to a method of adhering and building a belt member which transfers the belt member which embeds reinforcing cords made of metal arranged obliquely in parallel to each other in a rubber material and has at least a longitudinal distal end thereof obliquely cut along the direction of the cords onto a building drum at a belt building position from a supply portion which faces the belt building position in an opposed manner, using a supply conveyor which places the belt member thereon in a developed state at the supply portion for feeding the belt member toward the building position and a hand device which includes a press plate extending in the feeding direction of the supply conveyor, in a state that the belt member is held on a lower surface of the press plate of the hand device on the supply conveyor, the belt member is transferred to the building drum by the hand device along with a feeding operation of the supply conveyor and, at the same time, the belt member is adhered by pressing to a peripheral surface of the building drum from a distal end portion thereof while rotating the building drum in synchronism with the transfer of the belt member by the hand device.

According to this belt member adhering and building method, it is possible to transfer the belt member having a predetermined length which embeds the oblique reinforcing cords in the rubber material, for example, the belt member formed by bonding a large number of belt member pieces cut in a fine strip shape onto the building drum from the obliquely cut distal end portion in a state that the belt member is held by the hand device along with the feeding operation of the supply conveyer with almost no tension or with completely no tension and hence, the belt member can be easily, accurately and surely adhered to and built on the building drum by pressing the belt member to the peripheral surface of the building drum.

For every adhesion of the belt member of a predetermined length within a length range of the press plate of the hand device to the building drum, a motion which retracts the hand device to a position above the supply conveyor, holds the belt member on a lower surface of the press plate again, and transfers the belt member to the building drum along with the feeding operation of the supply conveyor may preferably be repeated, and the building drum may preferably be rotated in synchronism with the motion thus adhering by pressing the belt member to a peripheral surface of the building drum. Due to such constitution, the belt member can be transferred to the building drum without generating a tension over the whole length of the belt member and with no strain and, at the same time, it is possible to surely perform adhesion and building of the belt member by pressing the belt member to the peripheral surface of the drum.

In the method of adhering and building a belt member, the belt member having a predetermined length corresponding to one turn of a tire which has both longitudinal ends thereof obliquely cut along the direction of the cords may preferably be placed on the supply conveyor, and the belt member may preferably be transferred and adhered to the building drum. Due to such constitution, the belt member having the length corresponding to one turn of the tire can be transferred to the building drum thus surely enabling the adhesion and building of the belt member and, at the same time, it is possible to facilitate the adhesion and building of the belt member by transferring the belt member to the building drum while manufacturing the belt member having the length corresponding to one turn of the tire by bonding the obliquely cut belt member pieces having the predetermined length on the supply conveyer.

The hand device can transfer the belt member to the building drum along with a feeding operation of the supply conveyor in a state that the belt member on the supply conveyor is held by attraction on a lower surface of the press plate. Further, the hand device can transfer the belt member to the building drum along with the feeding operation of the supply conveyor in a state that the belt member on the supply conveyor is sandwiched and held between a lower surface of the press plate and an upper surface of the supply conveyor. In both cases, it is possible to transfer the belt member held in the above-mentioned manner without generating tension in the belt member. Particularly, by combining the above-mentioned holding states, the transfer of the belt member and the adhering and building of the belt member to the building drum can be performed with further accuracy.

The present invention is directed to an apparatus of adhering the belt member to carry out the above-mentioned method, wherein the apparatus includes a supply conveyor which places the belt member thereon at the supply portion for feeding the belt member toward the building position in a developed state and a hand device for transferring and adhering the belt member on the supply conveyor to the building drum and the hand device includes a moving body which is movable between a position above the supply conveyor and a position above the building position, and a holding member which is elevatably supported on the moving body, includes a plate-shaped press plate extending in the moving direction and is capable of holding the belt member on the supply conveyor on a lower surface of the press plate, the belt member is transferred to the building drum in a state that the belt member is held on the lower surface of the press plate along with the feeding operation of the supply conveyor, and the belt member is adhered by pressing to a peripheral surface of the building drum which is rotated in synchronism with the transfer of the belt member.

According to the apparatus of adhering and building a belt member, it is possible to adhere the belt member by pressing to the peripheral surface of the building drum while holding the belt member on the supply conveyor on the lower surface of the pressing plate of the hand device and by transferring the belt member toward the building drum with almost no tension or with completely no tension in the belt member and hence, the automation of adhering and building of the belt member is facilitated and, at the same time, the accuracy of building can be enhanced.

In the apparatus of adhering and building a belt member, the hand device may preferably be configured such that at least two holding members having press plates which are arranged parallel to the moving direction are arranged in parallel to each other, the press plates of two holding members on both sides are arranged to be held in contact with both widthwise side edge portions of the belt member, and a distance between two holding members on both sides is adjustable along with a width of the belt member. Due to such constitution, corresponding to the width of the belt member which differs corresponding to a kind or a size of a tire which is subject to building, a distance between the holding members on both sides can be adjusted. Due to this adjustment, both widthwise side edge portions of the belt member can be held on the lower surfaces of the press plates on both sides surely and in a well-balanced manner and hence, the belt member can be transferred to the building drum without generating strains and, at the same time, both side edge portions of the belt member can be surely adhered to and built on the building drum by pressing.

When a press plate which is arranged parallel to the press plate of the holding member on the same plane is arranged at an intermediate portion between two holding members on both sides, the belt member can be pressed to the building drum also at the center portion of the belt member in the widthwise direction and hence, it is possible to acquire a further favorable adhering and building state.

Further, in the apparatus of adhering and building a belt member, the holding member may preferably be configured such that magnetic attraction means which respectively include a magnet on lower end portions thereof and are extendible and retractable downwardly have lower end portions thereof extended from a lower surface of the press plate after penetrating the press plate.

Due to such constitution, it is possible to surely attract and hold the belt member on the lower surface of the press plate by making use of a magnetic attraction force which acts on the metal-made reinforcing cords in the inside of the belt member. Further, different from the use of an air suction, the magnetic attraction means can be formed in compact and, at the same time, an operation of the magnetic attraction means can be more easily controlled by an electric means.

In the apparatus of adhering and building the belt member, the supply conveyor may have an upper surface thereof arranged to be present on the substantially same plane as an uppermost surface of a peripheral surface of the building drum at the time of feeding the belt member, and the hand device may preferably be configured to transfer the belt member on the supply conveyor to the building drum along with a feeding operation of the supply conveyor in a state that the belt member is sandwiched and held between a lower surface of the press plate and an upper surface of the conveyor. Due to such constitution, it is possible to transfer the belt member in a stable manner without generating tension in the belt member.

Effect of the Invention

As described above, according to the method and apparatus of adhering and building a belt member of the present invention, it is possible to adhere and build the belt member on the supply conveyer having a predetermined length surely and with no strains along with the rotation of the building drum while transferring the belt member onto the building drum with almost no strain or with completely no strain in the belt member by holding the belt member with the hand device thus facilitating the automation of adhering and building of the belt member.

Further, since the belt member can be adhered and built without generating substantially no tension in the belt member as described above, the deformation or the strains of the belt member attributed to the tension is hardly generated. As a result, the occurrence of failure of bonding between the distal end and the rear end portion of the belt member on building can be also suppressed.

Particularly, according to the apparatus of adhering and building a belt member of the present invention, by arranging the plurality of holding members which constitute the hand device in parallel to each other and adjusting the distance between the holding members on both sides corresponding to a width of the belt member, the present invention is applicable to the adhering and building of belt members of various sizes having different widths.

DESCRIPTION OF THE REFERENCE NUMERALS AND SIGNS

B: belt-use strip-shaped material, B1: belt member, b: belt member piece, C: reinforcing cord, D: building drum, 1: moving support base, 2: track, 5: supply conveyor, 6: conveyor body, 7: scraper, 10: hand device, 11: moving means, 12: moving body, 13: elevation-use moving means, 14: mounting substrate, 15: lower plate, 16a, 16b: pressing plates, 16c: pressing plate at center portion, 17a, 17b: holding members on both sides, 18a, 18b: support plates, 20: magnetic attraction means, 21: cylinder device, 22: through holes, 23a, 23b: guides, 24: guide rails, 25: drive means, 26: pinion gear, 27a, 27b: racks

BEST MODE FOR CARRYING OUT THE INVENTION

Next, a mode for carrying out the present invention is explained based on an embodiment shown in drawings.

Figure 1:
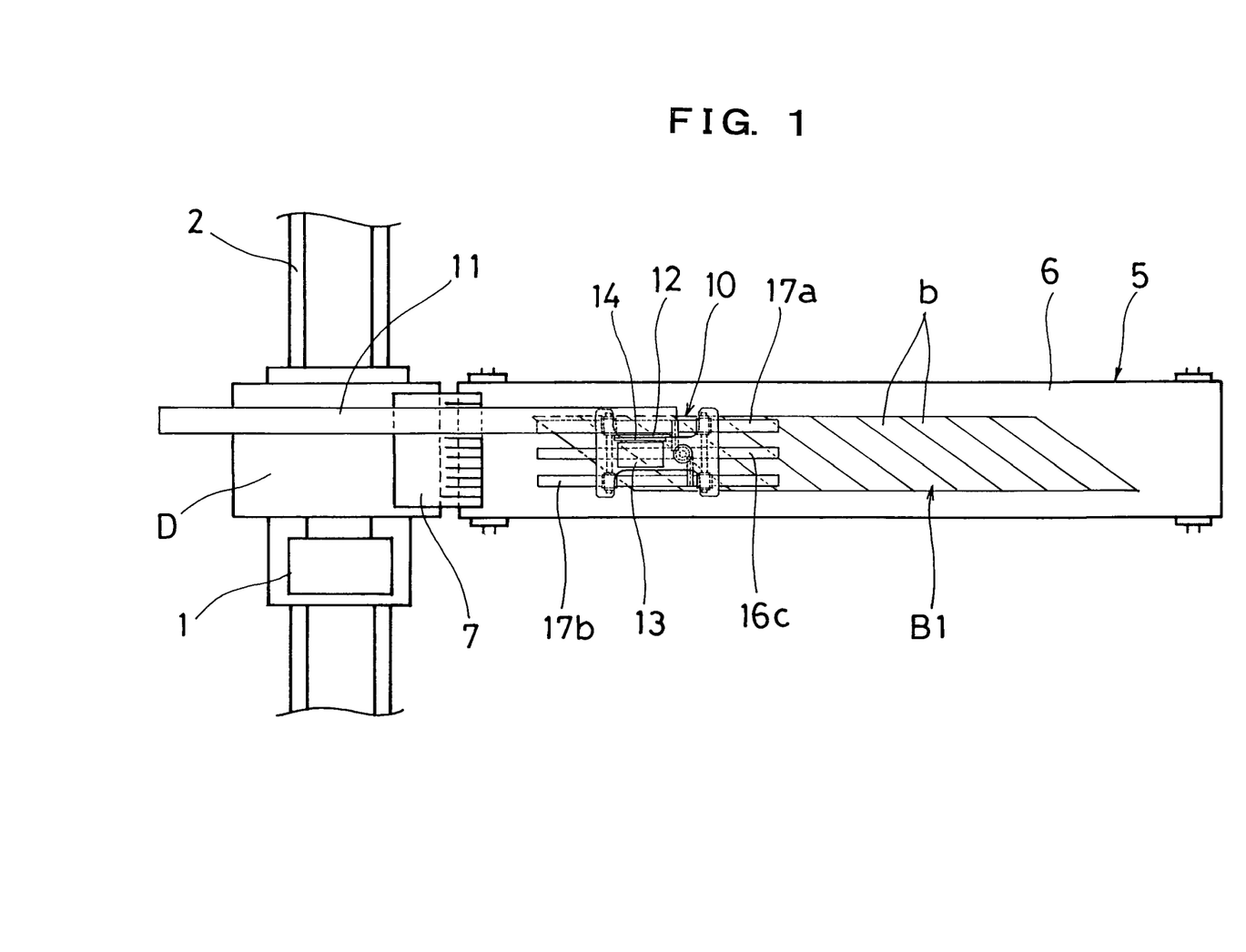
FIG. 1 is a plan view showing the schematic constitution of a belt-member adhering and building apparatus of the present invention.
Figure 2:
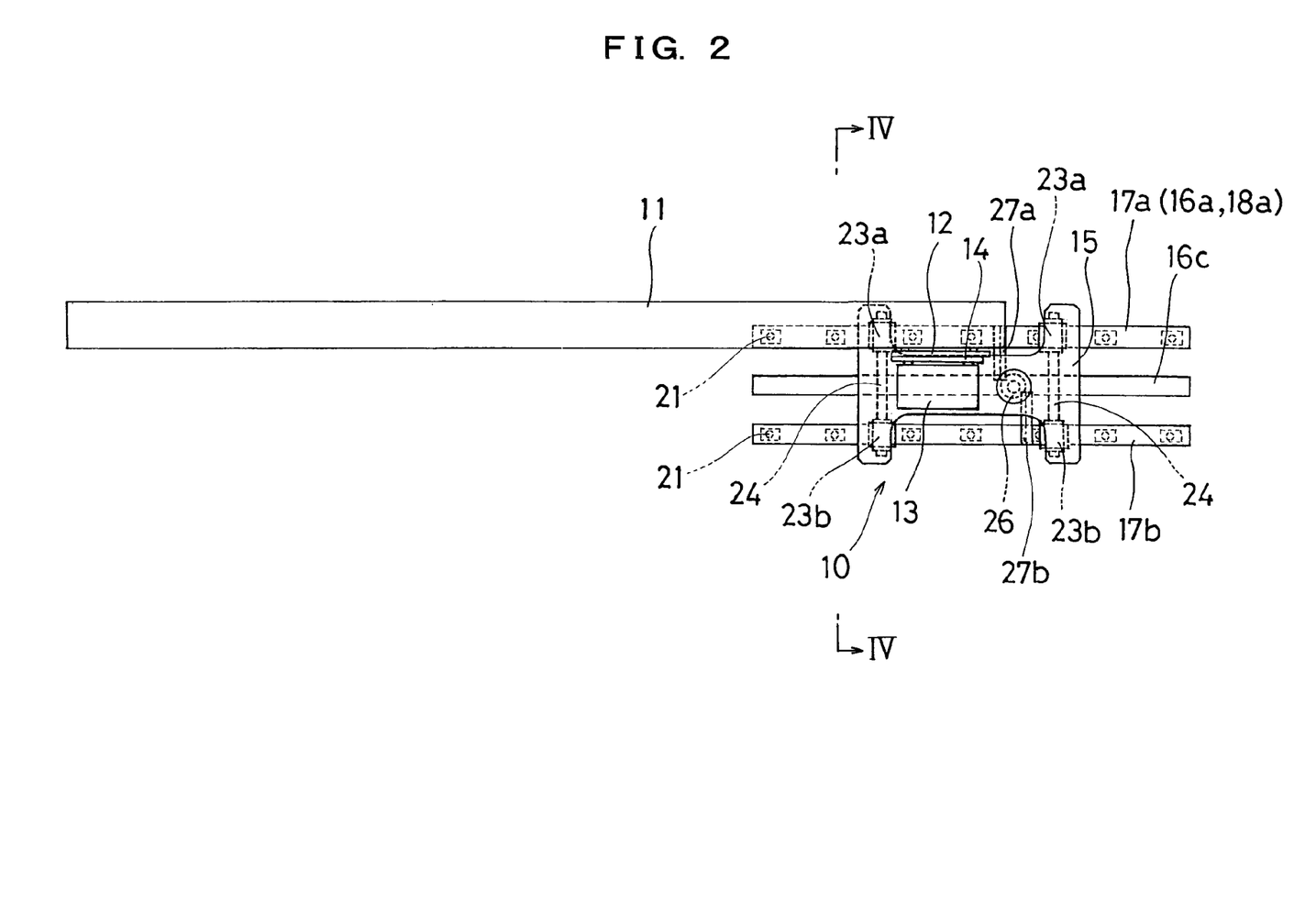
FIG. 2 is a plan view of a hand device of the belt-member adhering and building apparatus according to the invention.
Figure 3:
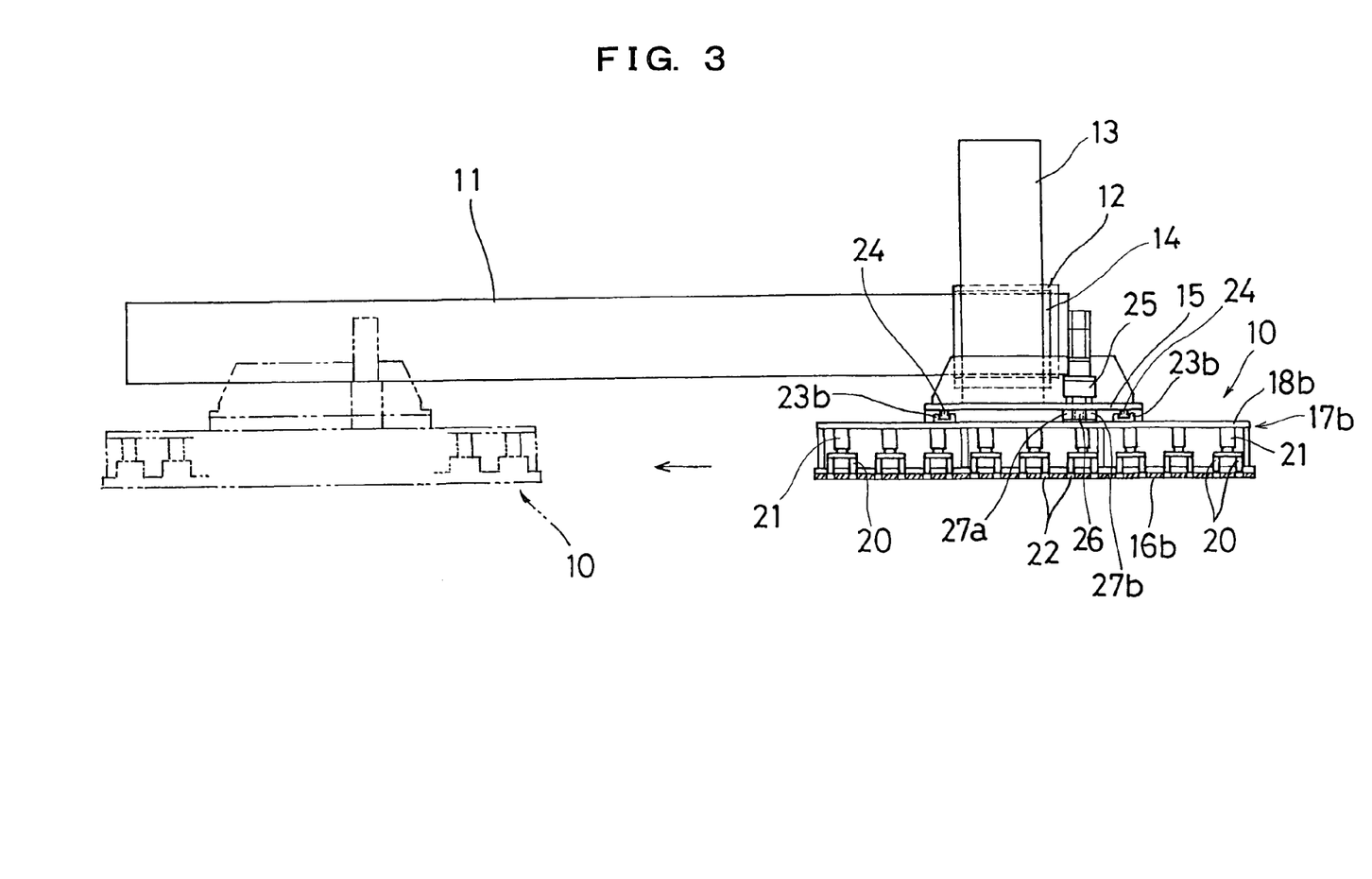
FIG. 3 is a side view of the belt-member adhering and building apparatus shown in FIG. 2.
Figure 4:
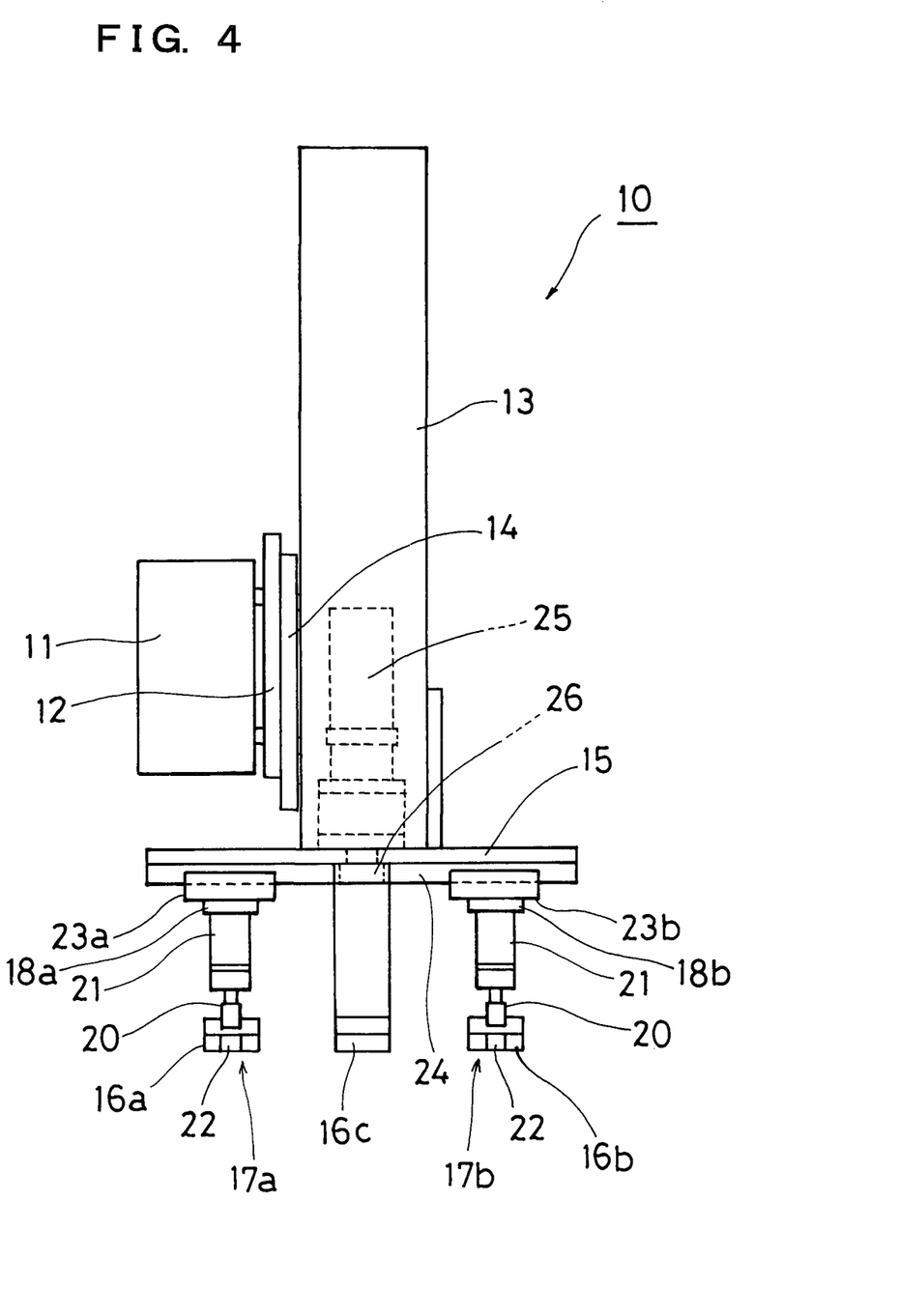
FIG. 4 is an enlarged cross-sectional view taken along a line IV-IV in FIG. 2.
Figure 5:
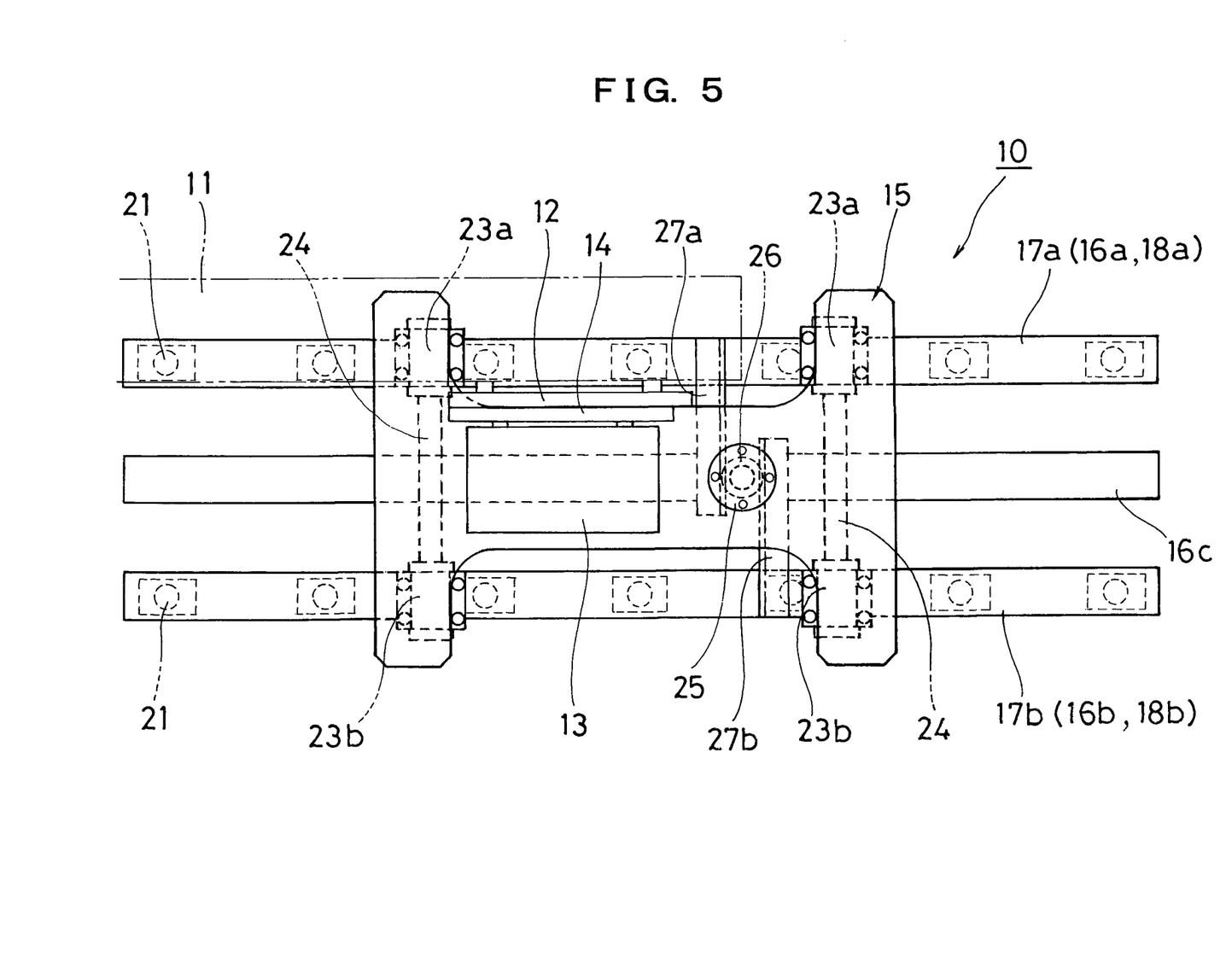
FIG. 5 is a partially enlarged plan view showing a mechanism of the apparatus for adjusting a distance.
Figure 6:
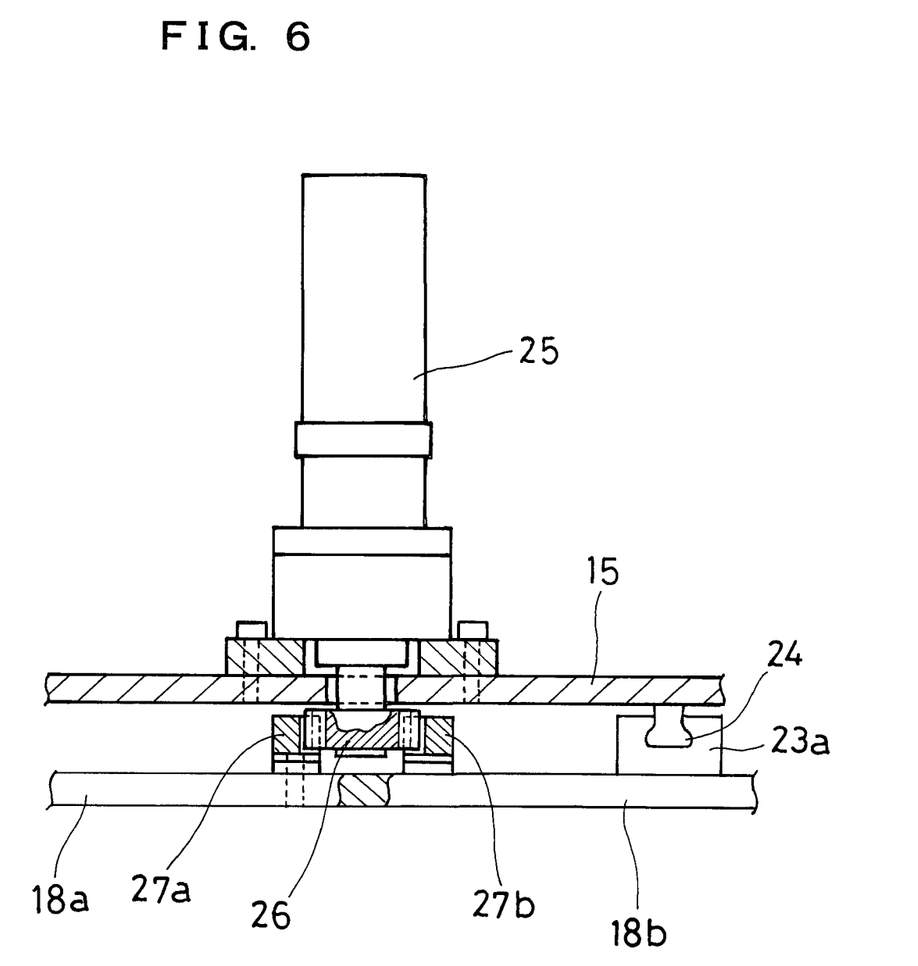
FIG. 6 is a partially enlarged cross-sectional view showing a mechanism of the apparatus for adjusting the distance.

FIG. 1 is a plan view showing the schematic constitution of a belt-member adhering and building apparatus of the present invention, FIG. 2 is a plan view of a hand device of the belt-member adhering and building apparatus, FIG. 3 is a side view of the belt-member adhering and building apparatus shown in FIG. 2, and FIG. 4 is an enlarged cross-sectional view taken along a line IV-IV in FIG. 2. FIG. 5 and FIG. 6 are a partially enlarged cross-sectional view and a partially enlarged plan view of a mechanism of the apparatus of adjusting a distance (width).

The embodiment shown in the drawings is directed to an apparatus of adhering and building a belt member B1 at a position where one layer out of a plurality of belt layers is built in a belt building step in manufacturing a tire, particularly, in a belt building step for building only a belt layer into a cylindrical shape separately from the building of a carcass layer.

Symbol D in the drawing indicates an extensible and shrinkable building drum for building a cylindrical belt band formed of a belt layer. This building drum D is supported on a moving support base 1 in a state that the building drum D is rotatably driven. The building drum D is transferred to a predetermined building position along a track 2, and is transferred to a next step after building. Symbol 5 indicates a supply conveyor arranged to face the building drum D at the building position in a supply portion for supplying the belt member B1. The supply conveyor 5 is configured to place the belt member B1 formed with a predetermined length corresponding to one turn of the building drum D thereon in a state that the supply conveyor 5 can feed the belt member B1 toward the building drum D in a developed state.

Figure 7:
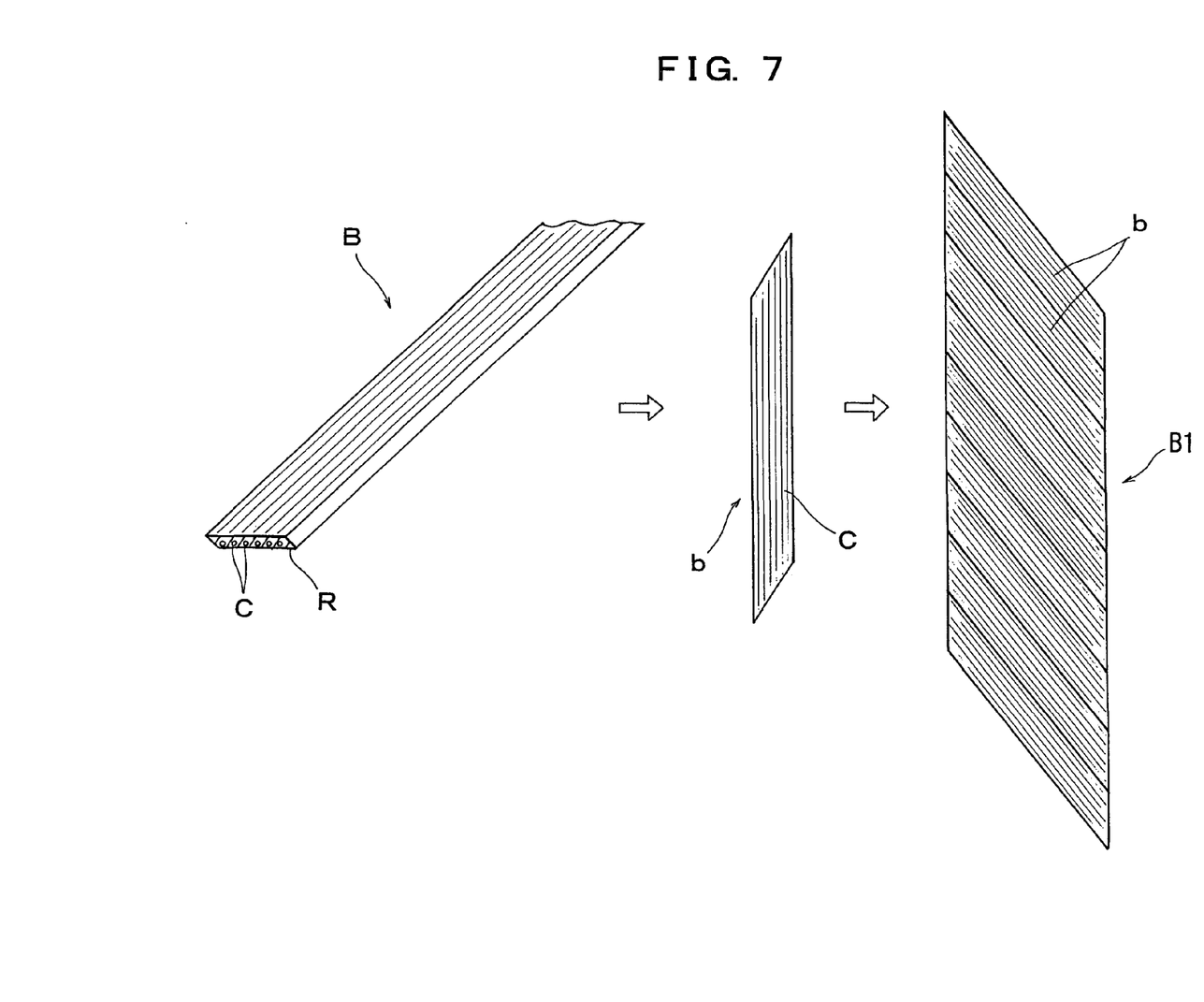
FIG. 7 is an explanatory view showing a state of forming a belt member.

The belt member B1 is basically formed in a manner as shown in FIG. 7. That is, an elongated belt-use strip-shaped material B having a relatively small width and embedding reinforcing cords C made of a metal material which constitutes a magnetic material and arranged parallel to each other in a rubber material R have both ends thereof cut obliquely with a predetermined length, and the obtained fine-strip-shaped belt member pieces b have oblique cut edges thereof arranged and have side ends thereof bonded to each other thus forming the belt member B1 having a length corresponding to one turn of the tire and arranging the direction of the reinforcing cords C oblique to the longitudinal direction. A width of the strip-shaped material B is usually 20 to 100 mm, and more preferably 30 to 50 mm. It is needless to say that the strip-shaped material B may be formed of a strip-shaped material having a width which does not fall within the above-mentioned range.

In the belt manufacturing apparatus in which the supply conveyor 5 manufactures the belt member B1 having a predetermined length by cutting the elongated belt-use strip-shaped material B into fine-strip-shaped belt member pieces b and by arranging and bonding the belt member pieces b to each other, the supply conveyor 5 may be configured to function also as an arrangement conveyor for arranging and bonding the fine-strip-shaped belt member pieces b to each other. It is needless to say that at the belt member to be adhered, a belt member which is manufactured in another step may be used. In this case, the belt member may be pulled out to the supply conveyor 5 from a transport car or the like and may be placed on the supply conveyor 5 in a developed state.

The supply conveyor 5 is constituted of a belt conveyor which can rotatably support an endless conveyor body 6 having a length larger than a maximum length of the belt member B1 corresponding to one turn of the tire and a width larger than a maximum width of the belt member B1 to be adhered and built. The supply conveyor 5 is rotated in the feeding direction by a driving means (not shown in the drawing) such as a motor to feed the belt member B1 placed on the supply conveyor 5 in a developed state in the forward direction. Usually, the supply conveyor 5 is provided in a state that a height of the supply conveyor 5 is adjustable. At least at the time of feeding the belt member B1, the height of the supply conveyor 5 is adjusted such that an upper surface which forms a mounting surface of the supply conveyor 5 (an upper surface of the conveyor body described later) is positioned substantially coplanar with an uppermost surface of the peripheral surface of the building drum D. In the drawing, symbol 7 indicates a scraper provided at a feed-side edge portion of the supply conveyor 5 and is configured to separate the belt member B1 from the conveyor body 6 at the time of feeding the belt member B1. The scraper 7 has an upper surface thereof arranged on the extension of the upper surface of the conveyor body 6 and has a distal end thereof arranged close to the peripheral surface of the building drum D located at the building position, and has a height substantially equal to a top surface of the building drum D. The belt member B1 which is transferred on the scraper 7 in a slidable manner can be adhered to the peripheral surface of the building drum D.

Symbol 10 indicates a hand device which constitutes an essential part of the belt-member adhering and building apparatus according to the present invention. The hand device has the following constitution.

As shown in FIG. 2 to FIG. 4, a moving means 11 such as a ball screw mechanism or the like which is rotatably driven by a servo motor is arranged ranging from a position above a feeding-side portion of the supply conveyor 5 to a position above the building drum D arranged at the building position. A moving body 12 driven by the moving means 11 is configured to be movable between the position above the supply conveyor 5 and the position above the building drum D, and the movement of the moving body 12 is suitably controlled.

An elevation-use moving means 13 such as a ball screw mechanism rotatably driven by the servo motor is attached to the moving body 12 by way of a mounting substrate 14 fixedly mounted on the moving body 12. The elevation-use moving means 13 configured to elevate the moving means per se relative to the mounting substrate 14 due to an operation thereof. Then, on a lower surface side of a lower plate 15 mounted on a lower end portion of the moving means 13, at least two holding members 17a, 17b which are arranged in parallel to each other are supported. Two holding members 17a, 17b include pressing plates 16a, 16b having a plate shape and extending in the above-mentioned moving direction and can hold the belt member B1 on the supply conveyor 5 onto lower surfaces of the pressing plates 16a, 16b. The above-mentioned two holding members 17a, 17b are arranged parallel to each other on both sides with a predetermined distance therebetween such that the lower surfaces of the pressing plates 16a, 16b are brought into contact with both widthwise side edge portions of the belt member B1 on the supply conveyor 5 due to lowering thereof above the supply conveyer 5. Due to such constitution, the belt member B1 can be held in a state that the belt member B1 is sandwiched between the lower surfaces of the pressing plates 16a, 16b and an upper surface of the supply conveyor 5.

In the case shown in the drawing, between the above-mentioned two holding members 17a, 17b, the above-mentioned pressing plate 16c which is capable of coming into contact with and pressing a center portion of the belt member B1 in the widthwise direction on the supply conveyor 5 due to lowering thereof above the supply conveyor 5 is arranged parallel to the pressing plates 16a, 16b of the holding members 17a, 17b on the same plane. The pressing plate 16c is fixedly mounted on the lower plate 15.

The above-mentioned respective holding members 17a, 17b on both sides are provided with support plates 18a, 18b above the respective pressing plates 16a, 16b in a spaced-apart manner, and a plurality of magnetic attraction means 20 respectively having a magnet on distal end portions (lower end portions) thereof are mounted on the respective support plates 18a, 18b with a predetermined distance in the longitudinal direction. The respective support plates 18a, 18b are mounted downwardly by way of cylinder devices 21. In a state that the belt member B1 on the supply conveyer 5 is pressed by the respective pressing plates 16a, 16b, upon actuation of the cylinder devices 21, the distal end portions (lower end portions) of the above-mentioned magnetic attraction means 20 extend downwardly after passing through holes 22 formed in the pressing plates 16a, 16b and hence, the belt member B1 can be held by attraction on the lower surfaces of the pressing plates 16a, 16b by making use of a magnetic attraction force which acts on the magnetic-metal-made cords. Accordingly, the hand device 10 can transfer the belt member B1 on the supply conveyor 5 onto the building drum D from the distal end portion in a state that the belt member B1 is held by attraction on the lower surfaces of the pressing plates 16a, 16b. Here, the pressing plate 16c at the center portion of the supply conveyor 5 may be also configured to include a magnetic attraction means having a magnetic holding function substantially equal to a magnetic holding function of the holding members 17a, 17b on both sides.

With respect to the holding members 17a, 17b on both sides of the hand device 10, guides 23a, 23b fixed to the support plates 18a, 18b are engaged with guide rails 24 attached to a lower surface of the lower plate 15 such that the guides 23a, 23b are slidable in the lateral direction. Further, on a lower surface side of the lower plate 15, racks 27a, 27b which are respectively fixedly mounted on the support plates 18a, 18b of the holding members 17a, 17b on both sides in the widthwise direction (lateral direction) orthogonal to the longitudinal direction are meshed with front and rear portions of a pinion gear 26 rotated by a rotary drive means 25 such as a servo motor. Along with the movements of the racks 27a, 27b in the directions opposite to each other due to the rotation of the above-mentioned pinion gear 26, the holding members 17a, 17b are displaced in the widthwise direction. Accordingly, the distance between the holding members 17a, 17b on both sides can be suitably adjusted corresponding to the width of the belt member B1 which is an object to be manufactured.

The moving means for adjusting the distance between the holding members 17a, 17b is not limited to the above-mentioned pinion-and-rack mechanism and various means including a worm and worm-wheel mechanism or a linear motor can be used.

A moving speed of the moving body 13 is set to a speed equal to the feeding speed of the belt member B1 corresponding to the feeding of the belt member B1 by the supply conveyor 5. Further, the moving speed of the moving body 13 is set to a speed corresponding to an adhesion speed of the belt member B1 to the outer peripheral surface of the building drum D. That is, the building drum D is rotated corresponding to the feeding of the belt member B1 and is set such that the adhesion speed of the belt member B1 on the outer peripheral surface of the building drum D corresponds to the feeding speed.

Here, the holding means of the holding members 17a, 17b are not limited to the above-mentioned utilization of the magnetic attraction means 20 shown in the drawing, and other suction means by suction or the like may be used. However, in an actual use, the use of the above-mentioned magnetic attraction means 20 is preferable in view of making the holding means compact and facilitating an operation control. Further, the holding members 17a, 17b are not always required to include the holding means such as the magnetic attraction means, and the belt member B1 on the conveyor 5 may be transferred in a holding state that the belt member B1 is sandwiched between the pressing plates 16a, 16b and the upper surface of the supply conveyor 5 due to a pressing force of the pressing plates 16a, 16b. However, from a viewpoint of stability of the holding state, it is desirable to provide the holding means of the embodiment shown in the drawing.

The moving means 11 and the elevation-use moving means 13 of the hand device 10 are controlled such that the belt member B1 is transferred to the building drum D while holding the belt member B1 on the lower surfaces of the pressing plates 16a, 16b along with the feeding of the supply conveyor 5 and, at the same time, the belt member B1 is adhered by pressing to the peripheral surface of the building drum D which is rotated in synchronism with the transfer of the belt member B1. That is, the building drum D is configured to be rotated at a peripheral speed in synchronism with the moving speed of the hand device.

In adhering and building the belt member B1 by the above-mentioned belt-member adhering and building apparatus of this embodiment, the distance between the holding members 17a, 17b on both sides provided to the hand device 10, that is, the distance between the pressing plates 16a, 16b is preliminarily adjusted corresponding to a width of the belt member B1 which is an object to be adhered.

Further, in a state that the belt member B1 formed by arranging the fine-strip-shaped belt member pieces and bonding the belt member pieces by the belt manufacturing apparatus is placed on the supply conveyor 5 opposing to the building drum D at the building position in a developed state, the holding members 17a, 17b of the hand device 10 are positioned at standby positions above the supply conveyor 5.

Figure 8A:
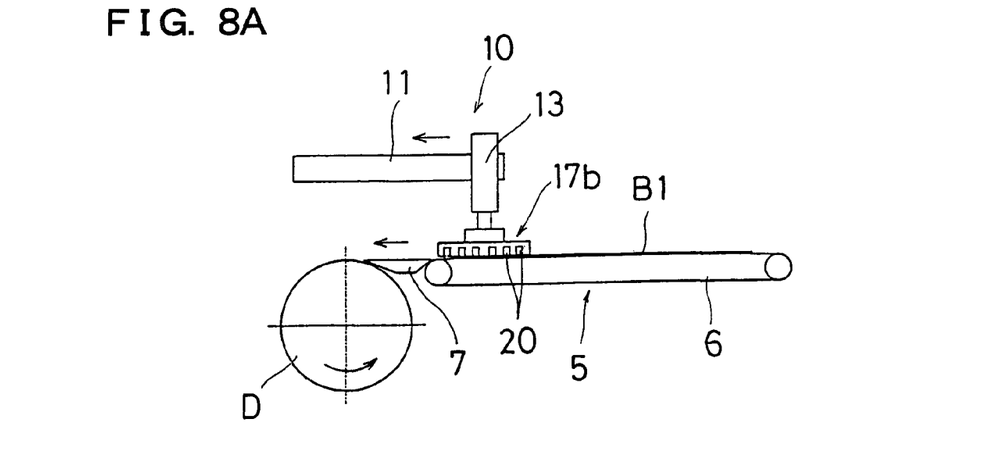
FIG. 8A is a schematic view showing an operational step of an adhering state of the belt member.

By operating the apparatus in the above-mentioned manner, the holding members 17a, 17b supported on the moving body 12 which is movable between the position above the supply conveyor 5 and the position above the building drum D by way of the elevation-use moving means 13 are lowered together with the moving means 13 by operating the elevation-use moving means 13. Accordingly, the lower surfaces of the holding members 17a, 17b, that is, the lower surfaces of the pressing plates 16a, 16b are brought into pressure contact with the vicinity of a feeding-side edge portion of the belt member B1 on the supply conveyor 5 together with the pressing plate 16c at the center portion of the supply conveyor 5. In such a state, the magnetic attraction means 20 provided to the holding members 17a, 17b are extended downwardly by operating the cylinder devices 21 so as to extend a distal end portion (lower end portion) thereof to lower surface sides of the pressing plates 16a, 16b and hence, both side edge portions of the belt member B1 in the vicinity of distal end portion are held by magnetic attraction on the lower surfaces of the pressing plates 16a, 16b in an attracted state (FIG. 8A).

Next, in the above-mentioned holding state, simultaneously with the feeding of the belt member B1 by operating the supply conveyor 5, by operating the moving means 11 of the hand device 10, the holding members 17a, 17b on both sides are moved together with the moving body 12 in the feeding direction in a state that the distal end portion of the belt member B1 is held between the supply conveyor 5 and the holding members 17a, 17b thus transferring the distal end portion of the belt member B1 to the building drum D. Here, when necessary, the belt member B1 may be transferred in a state that the belt member B1 is slightly floated from the supply conveyor 5 by operating the elevation-use moving means 13.

Figure 8B:
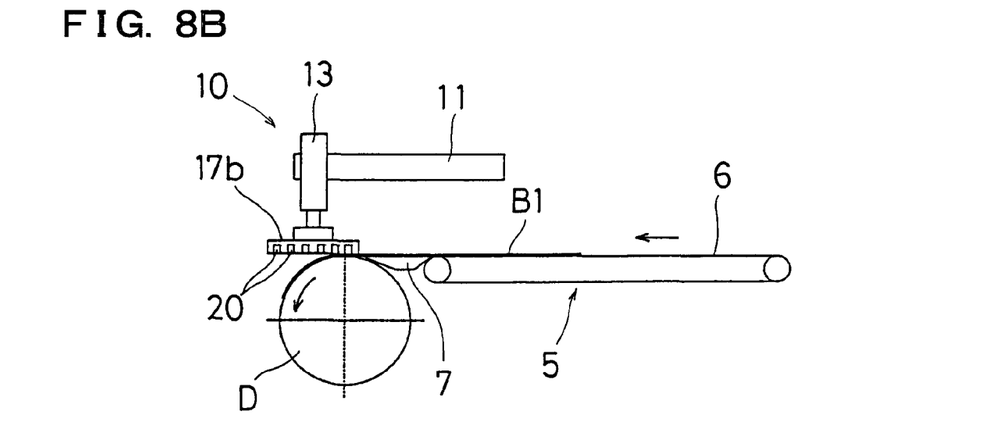
FIG. 8B is a schematic view showing an operational step of an adhering state of the belt member.

Then, when the distal end portion of the belt member B1 held on the lower surfaces of the pressing plates 16a, 16b of both holding members 17a, 17b reaches the peripheral surface of the building drum D, the building drum D is rotatably driven and is rotated at a speed corresponding to the transfer speed and, at the same time, the pressing plates 16a, 16b press and adhere both widthwise side edge portions of the belt member B1 to the peripheral surface of the building drum D (FIG. 8B). Here, simultaneously with such an operation, the pressing plate 16c at the center portion presses the center portion of the belt member B1 in the widthwise direction to the peripheral surface of the building drum D and hence, it is possible to approximately uniformly adhere both widthwise side edge portions and the center portion of the belt member B1 to the building drum D. Here, in performing the above-mentioned adhesion of the belt member B1, a downward force may be applied by the elevation-use moving means 13.

Figure 8C:
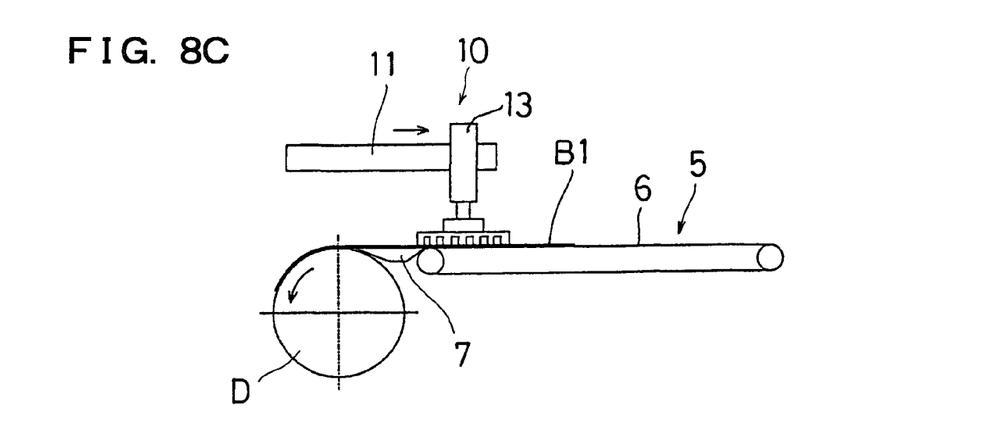
FIG. 8C is a schematic view showing an operational step of an adhering state of the belt member.
Figure 8D:
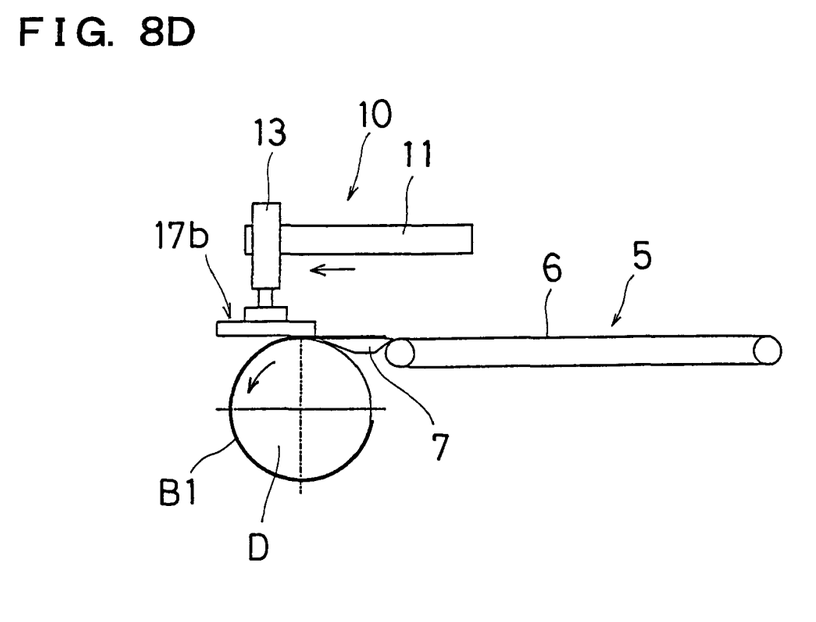
FIG. 8D is a schematic view showing an operational step of an adhering state of the belt member.
Figure 8E:
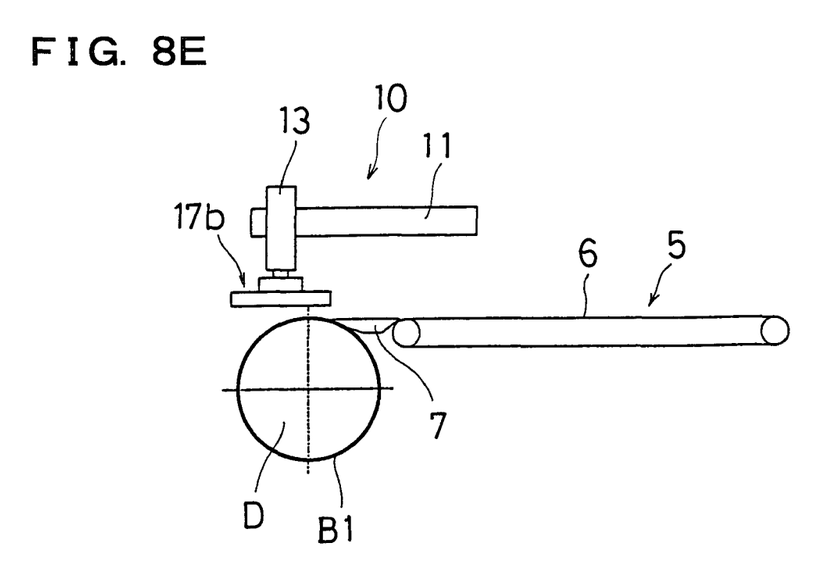
FIG. 8E is a schematic view showing an operational step of an adhering state of the belt member.

Next, upon completion of the adhesion of the belt member B1 of a predetermined length within a length range of the pressing plates 16a, 16b of the holding members 17a, 17b, the attraction by the magnetic attraction means 20 is released. The holding members 17a, 17b are elevated together with the elevation-use moving means 13 by operating the elevation-use moving means 13. Due to the further operation of the moving means 11, contrary to the above-mentioned operation, the holding members 17a, 17b are moved to a position above the supply conveyor 5 and return to an original position. Then, the holding members 17a, 17b are lowered again such that the holding members 17a, 17b are brought into contact with the belt member B1 on the supply conveyor 5 so that the belt member B1 is attracted and adhered to the lower surfaces of the pressing plates 16a, 16b by the magnetic attraction means 20 (FIG. 8C). In the same manner as the above-mentioned operation, by moving the belt member B1 onto the peripheral surface of the building drum D corresponding to the feeding operation by the supply conveyor 5 while holding the belt member B1, the belt member B1 is adhered to the peripheral surface of the building drum D (FIG. 8D). By repeating such operations, the belt member B1 of the whole length on the supply conveyor 5 is adhered to and built on the building drum D (FIG. 8E). Thereafter, the holding members 17a, 17b are made to return to the original position above the supply conveyor 5 and stand by for next belt-member adhering and building operation.

In this manner, in a state that the belt member B1 on the supply conveyor 5 is held on the lower surfaces of the pressing plates 16a, 16b of the hand device 10, the belt member B1 is transferred to the building drum D without generating almost no tension along with the feeding operation of the supply conveyor 5 and is adhered by pressing to and built on the peripheral surface of the building drum D easily, surely and in a balanced manner along with such transfer of the belt member B1. Accordingly, the belt building efficiency can be enhanced thus increasing the building accuracy.

Particularly, in an interlocking manner with a belt manufacturing device which manufactures the belt member B1 of a predetermined length by cutting the elongated belt-use strip material B into the fine-strip-shaped belt member pieces b and by arranging and bonding the belt member pieces b together, the adhering and building of the belt member can be easily automated.

Further, the adhering and building of the belt member b1 can be performed without generating almost no tension as described above and hence, the deformation of the belt member B1 attributed to the tension is hardly generated. As a result, the occurrence of the failure of bonding between the distal end and the rear end portion of the belt member B1 on building can be suppressed and, eventually, the durability of the belt layer can be enhanced, and the uniformity of the annular belt layer is increased thus enhancing the uniformity of the tire.

Here, in the above-mentioned embodiment, the explanation has been made with respect to the apparatus for adhering and building the belt member B1 which constitutes one layer out of the plurality of layers. However, apparatuses of adhering other belt member have the substantially same constitution.

Further, the above-mentioned method and apparatus of the present invention is also applicable to a case which uses, as a belt member to be adhered, a conventional belt member formed by fixed size cutting which is obtained by cutting an elongated belt member wound in a roll shape into a length corresponding one turn of a tire as well as a case which performs adhering and building of the belt member by pulling out an elongated belt member wound in a roll shape onto a building drum by way of a supply conveyor.

INDUSTRIAL APPLICABILITY

The method and apparatus of adhering and building a belt member of the present invention is, in a building step in manufacture of the tire, applicable to building of the belt layer by supplying the belt member to the building drum. The method and apparatus of adhering and building a belt member of the present invention is particularly applicable to the continuous adhering and building of the belt member in the manufacturing step of the belt member having the length corresponding to one turn of the tire by obliquely cutting the elongated belt-use strip material having the relatively small width into the predetermined length and by bonding the cut belt member pieces of predetermined length to each other.

The invention claimed is:

1. A method of transferring and adhering a pre-built belt member onto a building drum, the pre-built belt member already embedded with reinforcing cords made of metal arranged obliquely in parallel to each other in a rubber material and has at least a longitudinal distal end thereof obliquely cut along the direction of the cords, at a belt building position from a supply portion which faces the belt building position in an opposed manner, said method comprising:
   using a supply conveyor to feed the pre-built belt member toward the building position and
   using a hand device, which includes a press plate extending in the feeding direction of the supply conveyor, such that the pre-built belt member is held on a lower surface of the press plate of the hand device while also being located on the supply conveyor, and thereby moves toward the building drum while being directly sandwiched between the press plate and the supply conveyor,
   wherein the pre-built belt member is transferred to the building drum by the hand device along with a feeding operation of the supply conveyor and, at some point after the hand device has begun to cross the distal end of the supply conveyor, the pre-built belt member is adhered to the building drum by the hand device pressing the pre-built belt member to a peripheral surface of the building drum while rotating the building drum in synchronism with the transfer of the pre-built belt member by the hand device,
   wherein each portion the pre-built belt member is carried to and wound around the building drum by the press plate of the hand device,
   wherein the hand device traverses back and forth, engages a section of the pre-built belt member from the supply conveyor and adhering it to the building drum, and then returning to the supply conveyor to engage the next section of the pre-built belt member and adhering it to the building drum, this step being done until the entire pre-built belt member is adhered to the building drum,
   wherein when the hand device is returning to the supply conveyor to engage the next section of the pre-built belt member, the hand device is in a retracted position above the supply conveyor,
   wherein the hand device traverses back and forth, engages a section of the pre-built belt member from the supply conveyor and adhering it to the building drum, and then returning to the supply conveyor to engage the next section of the pre-built belt member and adhering it to the building drum, at least 3 times.

2. The method according to claim 1, wherein the pre-built belt member has a predetermined length corresponding to one turn of a tire,
   wherein said pre-built belt member has pre-cut ends which have been obliquely cut along the direction of the cords, and wherein
   said pre-built belt member is placed on the supply conveyor and transferred and adhered to the building drum.

3. The method according to claim 1, wherein the hand device transfers the pre-built belt member to the building drum along with a feeding operation of the supply conveyor in a state that the pre-built belt member on the supply conveyor is held by attraction on a lower surface of the press plate.

* * * * *

UNITED STATES PATENT AND TRADEMARK OFFICE
CERTIFICATE OF CORRECTION

PATENT NO.        : 8,454,777 B2
APPLICATION NO.   : 12/162524
DATED             : June 4, 2013
INVENTOR(S)       : Takatsuka et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this
Eighth Day of September, 2015

Michelle K. Lee
*Director of the United States Patent and Trademark Office*